United States Patent
Hong et al.

(10) Patent No.: US 12,005,869 B2
(45) Date of Patent: Jun. 11, 2024

(54) RUBBER BUCKET AND TIRE REPAIRING AND INFLATION DEVICE

(71) Applicant: ACTIVE TOOLS INTERNATIONAL (HK) LTD., Causeway Bay (HK)

(72) Inventors: Jui Hung Wesley Hong, Causeway Bay (HK); Koon Fung Lam, Hong Kong (CN); Jianghua Yan, Causeway Bay (HK); Huilong Ji, Causeway Bay (HK)

(73) Assignee: ACTIVE TOOLS INTERNATIONAL (HK) LTD., Causeway Bay (HK)

( * ) Notice: Subject to any disclaimer, the term of this patent is extended or adjusted under 35 U.S.C. 154(b) by 0 days.

(21) Appl. No.: 17/919,233

(22) PCT Filed: Apr. 16, 2020

(86) PCT No.: PCT/CN2020/085076
§ 371 (c)(1),
(2) Date: Dec. 7, 2022

(87) PCT Pub. No.: WO2021/208004
PCT Pub. Date: Oct. 21, 2021

(65) Prior Publication Data
US 2023/0166696 A1    Jun. 1, 2023

(51) Int. Cl.
*B60S 5/04*    (2006.01)
*B29C 73/16*   (2006.01)

(52) U.S. Cl.
CPC ............. *B60S 5/04* (2013.01); *B29C 73/166* (2013.01)

(58) Field of Classification Search
CPC ................ B29C 73/166; B29C 73/025; B29L 2031/712
(Continued)

(56) References Cited

U.S. PATENT DOCUMENTS

| 8,640,744 B2 | 2/2014 | Dowel |
| 8,746,293 B2 | 6/2014 | Chou |

(Continued)

FOREIGN PATENT DOCUMENTS

| CN | 101032952 A | 9/2007 |
| CN | 101408155 A | 4/2009 |

(Continued)

OTHER PUBLICATIONS

International Application No. PCT/CN2020/085076, International Search Report, dated Jan. 18, 2021.

(Continued)

*Primary Examiner* — Timothy P. Kelly
(74) *Attorney, Agent, or Firm* — MARSHALL, GERSTEIN & BORUN LLP (57) ABSTRACT

The present application discloses a sealant container and a tire repair and inflation device using the sealant container. The sealant container comprises: a container body having an internal space for storing sealant and a container mouth with an inner wall; and a core component installed onto the container mouth and extending toward the internal space after installation. The core component has an outer end, an inner end, and a first channel between the outer end and the inner end inside the core component for passage of gas, wherein the outer end is provided with an interface, and the inner end is provided with at least one openable outlet to communicate with the internal space when the outlet is opened; and wherein the inner wall further defines a second channel for passage of sealant. The sealant container has a simplified structure and good sealing performance.

20 Claims, 7 Drawing Sheets

(58) Field of Classification Search
USPC .......................................................... 141/38
See application file for complete search history.

(56) References Cited

U.S. PATENT DOCUMENTS

| | | | |
|---|---|---|---|
| 8,978,717 B2 | 3/2015 | Nakao et al. | |
| 9,272,587 B2 | 3/2016 | Taniguchi et al. | |
| 9,333,715 B2 | 5/2016 | Kono | |
| 2008/0092984 A1* | 4/2008 | Marini | B29C 73/166 |
| | | | 222/394 |
| 2012/0000572 A1* | 1/2012 | Chou | B29C 73/166 |
| | | | 141/38 |
| 2013/0092286 A1 | 4/2013 | Chou | |
| 2014/0224380 A1 | 8/2014 | Kono | |
| 2014/0224381 A1 | 8/2014 | Nakao et al. | |
| 2014/0366981 A1* | 12/2014 | Taniguchi | B60C 25/16 |
| | | | 141/38 |
| 2015/0041020 A1* | 2/2015 | Marini | B65D 85/70 |
| | | | 141/38 |
| 2016/0263846 A1 | 9/2016 | Kawatani et al. | |

FOREIGN PATENT DOCUMENTS

| | | |
|---|---|---|
| CN | 102271898 A | 12/2011 |
| CN | 102744894 A | 10/2012 |
| CN | 103085294 A | 5/2013 |
| CN | 205836045 U | 12/2016 |
| CN | 206664555 U | 11/2017 |
| JP | 2008155605 A | 7/2008 |
| JP | 2013071369 A | 4/2013 |
| JP | 2013075472 A | 4/2013 |
| JP | 2013141744 A | 7/2013 |
| JP | 2017056662 A | 3/2017 |

OTHER PUBLICATIONS

European Patent Application No. 20931307.1, Extended European Search Report, dated Dec. 8, 2023.
Japanese Patent Application No. 2022-563053, Notice of Reasons for Refusal, dated Jan. 17, 2024.
English-Language Translation of First Office Action and Search Report for Chinese Patent Application No. 202080099829.5, dated Oct. 14, 2023.

* cited by examiner

RUBBER BUCKET AND TIRE REPAIRING AND INFLATION DEVICE

CROSS REFERENCE TO RELATED APPLICATIONS

This application is the U.S. national phase of PCT Application No. PCT/CN2020/085076, filed on Apr. 16, 2020, the entire disclosure of which is hereby incorporated by reference in its entirety.

TECHNICAL FIELD

The present application relates to the technical field of automobile maintenance tools, in particular to a sealant container and a tire repair and inflation device using the sealant container.

BACKGROUND

When a car is running, the tire will sometimes have abnormal conditions, such as out of gas, damage, and the like. In this case, a spare tire is usually used to replace the tire that is out of gas or damaged, or a tire repair and inflation device is used for rapid tire repair and inflation.

Generally speaking, the tire repair and inflation device comprises an inflator and a sealant container. When it is necessary to inflate the tire, the inflator is connected to the air nozzle of the tire through a hose so that the inflator can directly inflate the tire. When it is necessary to repair the tire, the inflator is connected to the gas inlet of the sealant container, and the sealant outlet of the sealant container is connected to the air nozzle of the tire through hoses, such that the inflator can be used to inflate the sealant container, so that the sealant in the sealant container is pressurized to be injected into the tire through the air nozzle of the tire. And then, as the vehicle moves forward slowly, the injected sealant evenly covers the inner wall of the tire, thus completing tire repair.

SUMMARY

One aspect of the present application provides a sealant container that designs the way of outputting sealant, which comprises:
  a container body having an internal space for storing sealant, and a container mouth with an inner wall; and
  a core component installed onto the container mouth and extending toward the internal space when installed in place, the core component having an outer end, an inner end, and a first channel between the outer end and the inner end inside the core component for passage of gas, wherein the outer end is provided with an interface, and the inner end is provided with at least one openable outlet to communicate with the internal space when the outlet is opened;
  wherein the inner wall further defines a second channel for passage of sealant.

In one embodiment of the sealant container, the second channel is an annular channel defined by a gap between the inner wall and the core component.

In one embodiment of the sealant container, the sealant container further comprises a first valve mechanism which comprises:
  a first valve seat, wherein at least a portion of the inner wall forms the first valve seat;
  a first valve core, wherein the first valve core is the core component, and the first valve core is repeatedly movable relative to the first valve seat and has an initial position, and
  a container mouth sealing element arranged between the first valve seat and the first valve core for closing the second channel.

In one embodiment of the sealant container, the container mouth sealing element is fixed on the first valve seat, and the second channel is provided with a first spring element, wherein the first spring element is configured so that when the first first valve core is in the initial position, the first spring element presses a part of the first valve core against the container mouth sealing element, so that the container mouth sealing element closes the second channel.

In one embodiment of the sealant container, the container mouth comprises a first part and a second part fit and connected with the first part. The first part is integrally formed with the container body, and the second part is made of nylon material to increase strength.

In one embodiment of the sealant container, the core component is provided with a deformable first sealing element at the inner end, wherein the first sealing element covers the outlet to close the outlet when not deformed, and expands to open the outlet when deformed.

In one embodiment of the sealant container, the first sealing element is made of silicone and sleeved on the inner end.

In one embodiment of the sealant container, the inner end is provided with a groove to receive the first sealing element.

In one embodiment of the sealant container, the inner end is further provided with a conical head to facilitate the installation of the first sealing element on the core component.

In one embodiment of the sealant container, the sealant container further comprises a plurality of outlets arranged symmetrically on the groove.

Another aspect of the present application provides a tire repair and inflation device, which comprises:
  an inflator having a connecting portion; and
  a sealant container according to any of the above embodiments, wherein the sealant container is installed onto the connecting portion through the interface.

In one embodiment of the tire repair and inflation device, the inflator comprises a third channel to communicate with the first channel; and a fourth channel to selectively communicate with the second channel and the third channel, wherein the fourth channel is configured to receive gas from the third channel or sealant from the second channel, so as to deliver gas or sealant to the tire.

In one embodiment of the tire repair and inflation device, the inflator further comprises a locking device, wherein when the sealant container and the inflator are installed in place, the locking device fastens the sealant container and the inflator.

In one embodiment of the tire repair and inflation device, the locking device is arranged in the inflator, and snaps the sealant container and the connecting portion together at the side of the container mouth.

For the sealant container according to the present application, a gas inlet port and a sealant outlet port are both arranged at the mouth of the sealant container, while the sealant container has no other openings or hoses for gas inlet or sealant outlet, which simplifies the structure. The gas passes through the interior of the core component and enters into the internal space of the sealant container. In this way, the pressure in the container is increased to discharge the sealant. In addition, the sealant container can be used together with the inflator, so that the sealant can flow through the inflating channel in the inflator, thus eliminating the use of hoses outside the sealant container.

Various sealing elements are arranged at the core component and the container mouth to prevent sealant leakage and ensure proper opening of the sealant container when the sealant flows out. In addition, when gas enters, the sealing element within the sealant container expands to allow pressure rise in the container, so that the sealant is discharged under pressure. When the sealant container is not in use, the pressure in the container can help the sealing element seal the gas inlet channel to prevent the sealant from flowing out of the sealant container reversely through the gas inlet channel.

A valve mechanism is arranged at the container mouth, so that during installation, the sealant container can be repeatedly installed. The valve mechanism can be timely restored when the container is not installed in place until the sealant container is properly installed. When the sealant container is not installed in place, although the valve mechanism is open, the sealant container will not leak because high-pressure gas does not enter into the sealant container and the sealant is not pressurized.

Other aspects and features of the present application become apparent from the following detailed description with reference to the accompanying drawings. However, it should be appreciated that the drawings are designed only for the purpose of explanation, but are not to limit the scope of the present application, which should refer to the appended claims. It should also be appreciated that the drawings are intended only to conceptually illustrate the structure and process described herein, and unless otherwise specified, it is not necessary to draw the drawings to scale.

BRIEF DESCRIPTION OF THE DRAWINGS

The present application will be more fully understood by referring to the following detailed description of specific embodiments in combination with the drawings. The same reference numerals always denote the same elements in the drawings, where.

DETAILED DESCRIPTION

In order to help those skilled in the art to accurately understand the subject matter claimed in the present application, the specific embodiments of the present application are described in detail below in conjunction with the accompanying drawings.

The tire repair and inflation device according to the present application is used for inflating or repairing tires. The tire repair and inflation device comprises an inflator and a sealant container. When an inflating operation is in progress, a connection is established between the inflator and the tire to deliver compressed air to the tire. When a tire repairing operation is in progress, the sealant container is connected with the inflator, and the inflator is connected with the tire. The inflator is responsible for delivering compressed air to the sealant container, thus forcing the sealant to leave the sealant container for delivery to the tire through the inflator.

The sealant container according to the present application can also be used together with an existing inflator. Similar to the above, when an inflating operation is in progress, the inflator is connected to the tire; when a tire repairing operation is in progress, the sealant container is connected to the tire through the inflator. The inflator is equipped with at least one pipe for connection with the tire. The pipe can not only deliver gas to the tire during the inflating operation, but also deliver sealant to the tire during the tire repairing operation. According to the idea of the present application, an existing sealant container can also be retrofit to obtain a sealant container according to the present application, and the retrofit sealant container can be used with an existing inflator.

Figure 1:
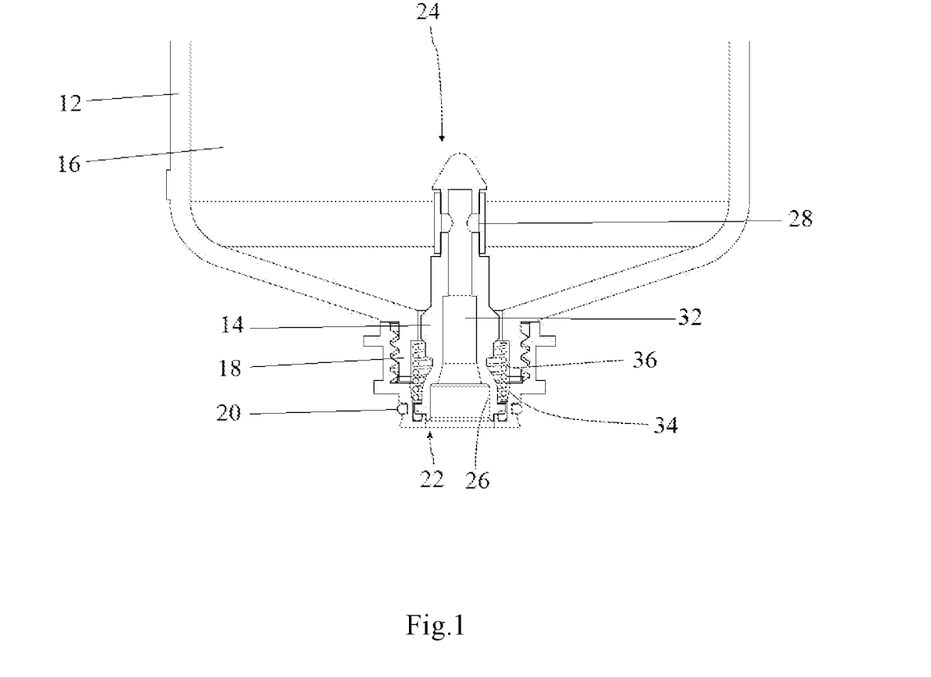
FIG. 1 is a schematic diagram of an embodiment of the sealant container according to the present application.

FIG. 1 is a schematic diagram of an embodiment of the sealant container according to the present application. The sealant container is also referred to as sealant bottle, sealant tank, and the like. The sealant container comprises a container body 12, a core component 14 and a cap (not shown). The container body 12 has an internal space 16 for storing sealant. The container body 12 can be a plastic container. The container body 12 has a container mouth 18 at its bottom, and the core component 14 is inserted into and installed together with the container mouth 18. FIG. 1 shows a sealant container in an inverted state. When the sealant container is not placed in the inverted state, the container mouth 18 is at the top of the container body 12. The core component 14 may be installed onto the container mouth 18 in a variety of ways. One way of installing the sealant container according to the present application will be introduced in detail below. When installed in place, the core component 14 is located in the center of the container mouth 18 and extends toward the internal space 16.

The core component 14 comprises an outer end 22 and an inner end 24. The "outer end" and "inner end" here are named relative to the interior of the container body 12. The outer end 22 is provided with an interface 26, which is used to connect with another object other than the sealant container, such as an inflator. The interface 26 can be connected with the other object in various ways, such as through assembly, contact, and the like. In the illustrated embodiment, the interface 26 is arranged on the inner side of the outer end 22 to allow the other object to extend into the interior of the core component 14 to establish a connection relationship. It can be conceivable, however, that the interface 26 can also be configured so that the outer end 22 of the core component 14 extends into the interior of the other object.

The inner end 24 of the core component 14 is provided with an openable outlet 28. When the outlet 28 is opened, the outlet 28 communicates with the internal space 16. When the outlet 28 is closed, the outlet 28 does not communicate with the internal space 16.

The interior of the core component 14 is a hollow structure, thereby defining a first channel 32 between the outer end 22 and the inner end 24. The first channel 32 is used for the passage of gas through the interior of the core component 14. For example, the compressed air from the inflator can enter into the container body 12 through the first channel 32, so the first channel 32 is a gas inlet channel. The configuration of the first channel 32 is not limited to what is illustrated. In the illustrated embodiment, the first channel 32 is connected with the interface 26 and the outlet 28, so that the gas can enter into the internal space 16 through the interface 26, the first channel 32 and the outlet 28, so as to inject high pressure into the sealant container.

The inner wall 36 of the container mouth 18 defines a second channel 34, which is used for the passage of sealant (i.e., the sealant from the internal space 16). The sealant flows along the container body 12 to the container mouth 18, and continues to flow along the inner wall 36, thus passing through the second channel 34, so as to flow out of the sealant container.

In the illustrated embodiment, a gap is present between the core component 14 and the inner wall 36, so the second channel 34 is provided between the inner wall 36 of the container mouth 18 and the outer side of the core component 14. In addition, the second channel 34 may be designed so as to define the sealant flow path. Furthermore, the size of the second channel 34 can be defined by designing the gap size between the inner wall 36 and the core component 14. When the sealant container is inverted, the second channel 34 can also be used as a temporary sealant storage due to gravity.

In the illustrated embodiment, the second channel 34 is annular. The gas enters into the internal space 16 through the first channel 32, and as the pressure in the container increases, the sealant is forced to flow out of the sealant container along the second channel 34, thus forming a "gas-in and sealant-out" mode of gas-entering from the centre and sealant-leaving along the circumference. It is not necessary to arrange an additional sealant outlet or connecting hose for the sealant container.

Figure 2:
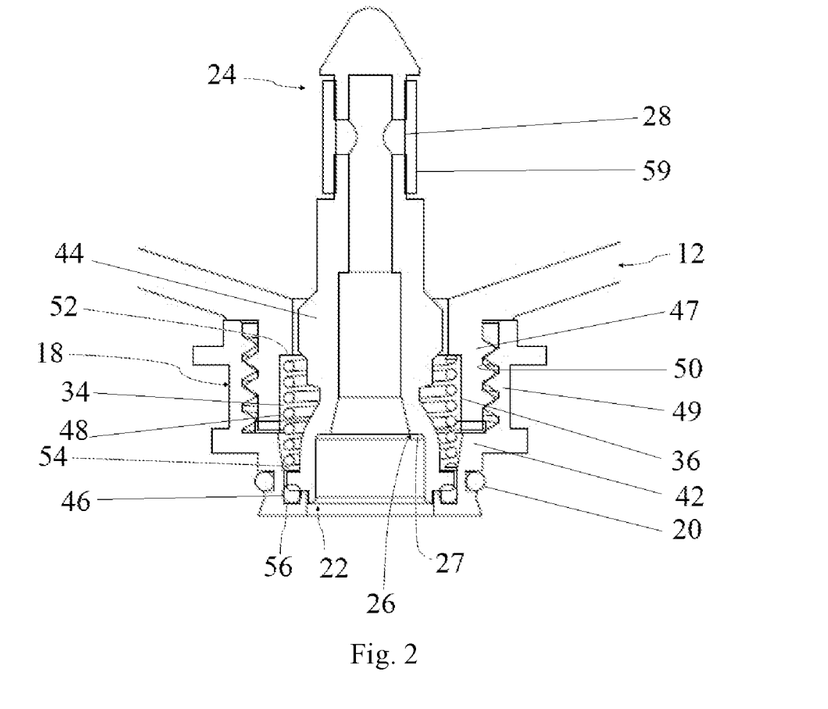
FIG. 2 is a partial enlarged view of the sealant container in FIG. 1, where the sealant container is in a closed state.
Figure 3:
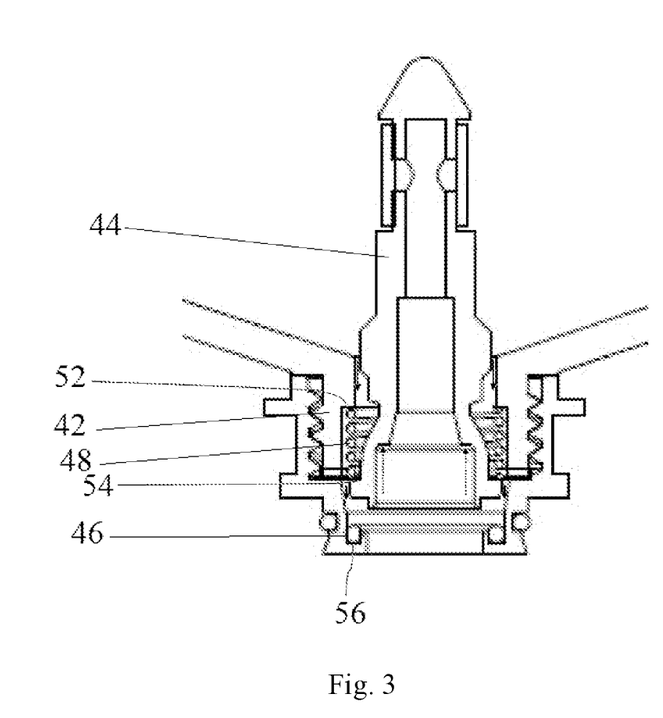
FIG. 3 is a partial enlarged view of the sealant container in FIG. 1, where the sealant container is in an open state.

FIG. 2 is a partial enlarged view of FIG. 1, showing a connection between the core component and the container mouth of the sealant container. The sealant container further comprises a first valve mechanism, which comprises a first valve seat 42, a first valve core 44 and a container mouth sealing element 46. At least a portion of the inner wall 36 of the container mouth forms the first valve seat 42. The core component may be used as the first valve core 44. Hereinafter, the first valve core and the core component refer to the same component. The first valve core 44 is movable relative to the first valve seat 42, so as to open or close the first valve mechanism. FIG. 2 shows the first valve mechanism in the initial position, i.e., a closed state. FIG. 3 shows one position of the first valve core during its movement, i.e., the valve in an open state. A first spring element 48, such as a spring shown in the figure, is arranged in the second channel 34. One end of the spring is connected with a flange 52 of the first valve seat 42, and the other end is connected with a surface of a flange 54 of the first valve core 44. In the initial position, the first spring element 48 acts to press the first valve core 44 against the first valve seat 42. In the embodiment shown in FIG. 2, the first valve seat 42 is provided with a ring groove 56 to place and fix the container mouth sealing element 46, which can be a sealing ring as shown in the figure. The other surface of the flange 54 of the first valve core 44 abuts against the container mouth sealing element 46 to deform it, thus realizing the sealing between the first valve seat 42 and the first valve core 44, so the sealant in the second channel 34 cannot flow out of the container mouth. In FIG. 3, the first valve core moves upward in the direction indicated by the dotted arrow in the figure, and squeezes the first spring element 48. At the same time, the container mouth sealing element 46 no longer closes the second channel 34 and returns to its original shape. The sealant can flow out of the sealant container in the direction indicated by the solid arrow. The flange 54 of the first valve core 44 is designed to have a gap with the first valve seat 42, which can ensure that the sealant can flow out smoothly through the second channel 34 during the movement of the first valve core 44. The first spring element 48 provides repeatability for the installation of the sealant container. If a user fails to install the sealant container at one time, the first spring element 48 restores, thus allowing the installation to continue for a second or more times until it is in place. It is conceivable that the first spring element 48 is not limited to being connected with the first valve seat 42 and the first valve core 44 in the above manner. In addition, the material used for the first spring element 48 can ensure a long-term compatibility of the first spring element 48 with the sealant.

The container mouth 18, as shown in FIG. 2, can be composed of two parts, i.e., a first part 47 and a second part 49. The first part 47 and the second part 49 are fit and connected together. As shown in the figure, the second part 49 has a fitting part 50 projecting radially outward. The fitting part 50 is provided with internal threads, and the first part 47 is provided with external threads, so that the first part 47 and the second part 49 are assembled together through threaded connection. A sealing element, such as a sealing ring, can also be added between the first part 47 and the second part 49 to enhance the sealing effect. The first part 47 and the second part 49 together form the first valve seat 42, so their inner walls jointly define the second channel 34. A sealing ring 20 is arranged on the outer side of the second part 49 and is sealingly connected with the cap (not shown). The first part 47 and the second part 49 can also be connected together in other conceivable connection manners. With this arrangement, the first part 47 can be integrally formed with the container body 12. The second part 49 can be made of materials different from that of the container body 12, thus improving the strength of the container mouth 18.

The interface 26 inside the first valve core 44 is configured to have a step 27, so as to receive the other object to drive the first valve core 44 to move. A drive mode is described in detail below.

Figure 4:
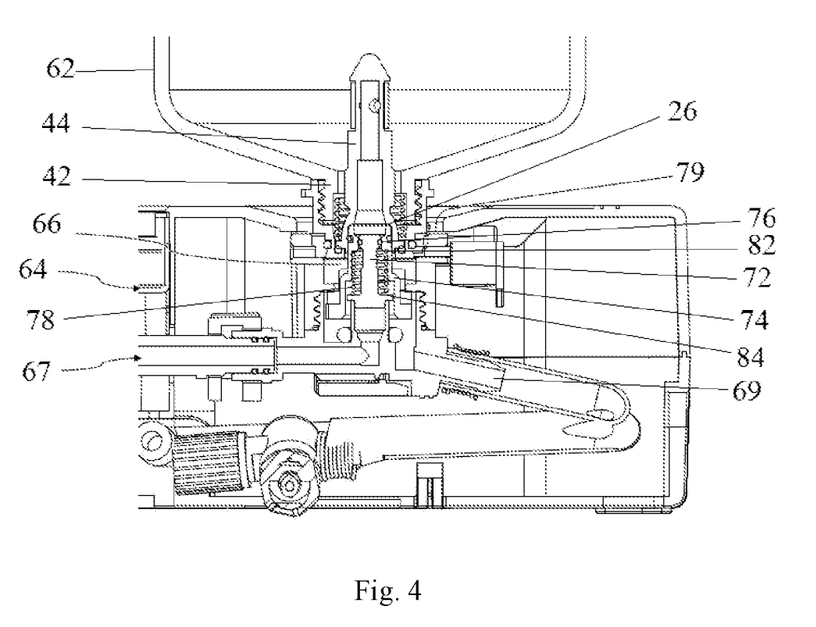
FIG. 4 is a schematic diagram of an embodiment of the tire repair and inflation device according to the present application, where the sealant container is ready to be installed with the inflator.
Figure 5:
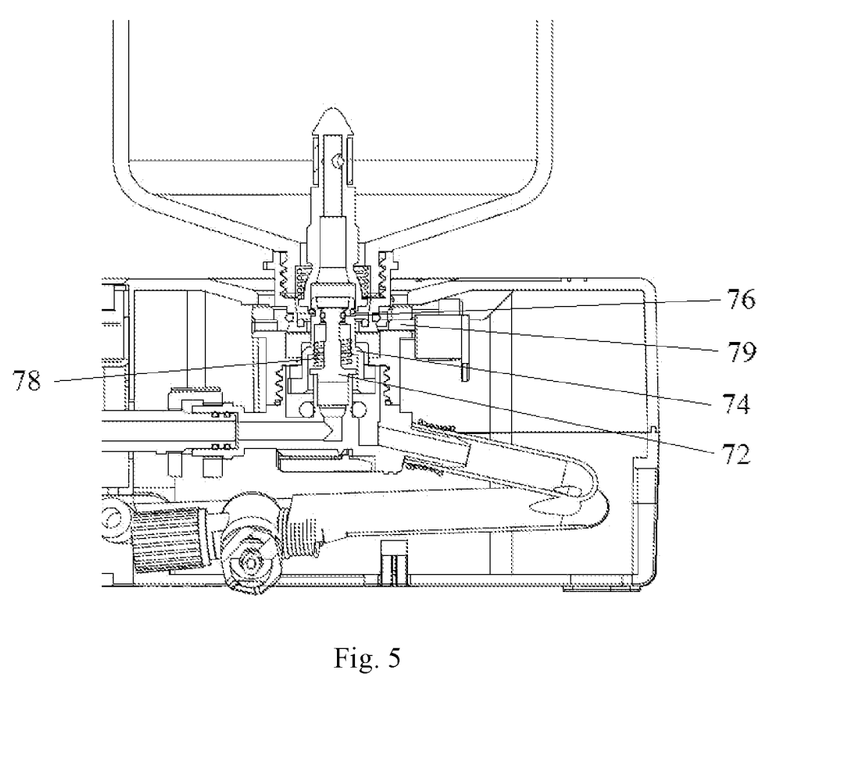
FIG. 5 is a schematic diagram of the tire repair and inflation device in FIG. 4 when the sealant container and the inflator are installed in place.

FIGS. 4 and 5 are schematic diagrams showing the connection between the sealant container and the inflator. FIG. 4 is a schematic diagram showing the installation of the sealant container getting started, and FIG. 5 is a schematic diagram showing the sealant container installed in place onto the inflator. First, the inflator is discussed. The inflator 64 is provided at least with a third channel 67, a fourth channel 69, and a connecting portion 66 between the third channel 67 and the fourth channel 69. Wherein, the third channel 67 is used for delivering pressurized gas, and the gas is delivered to the connecting portion 66. The fourth channel 69 is further connected between the connecting portion 66 and another object other than the inflator, such as a tire, for receiving gas or sealant from the connecting portion 66 and delivering the gas or sealant to the tire.

Figure 6:
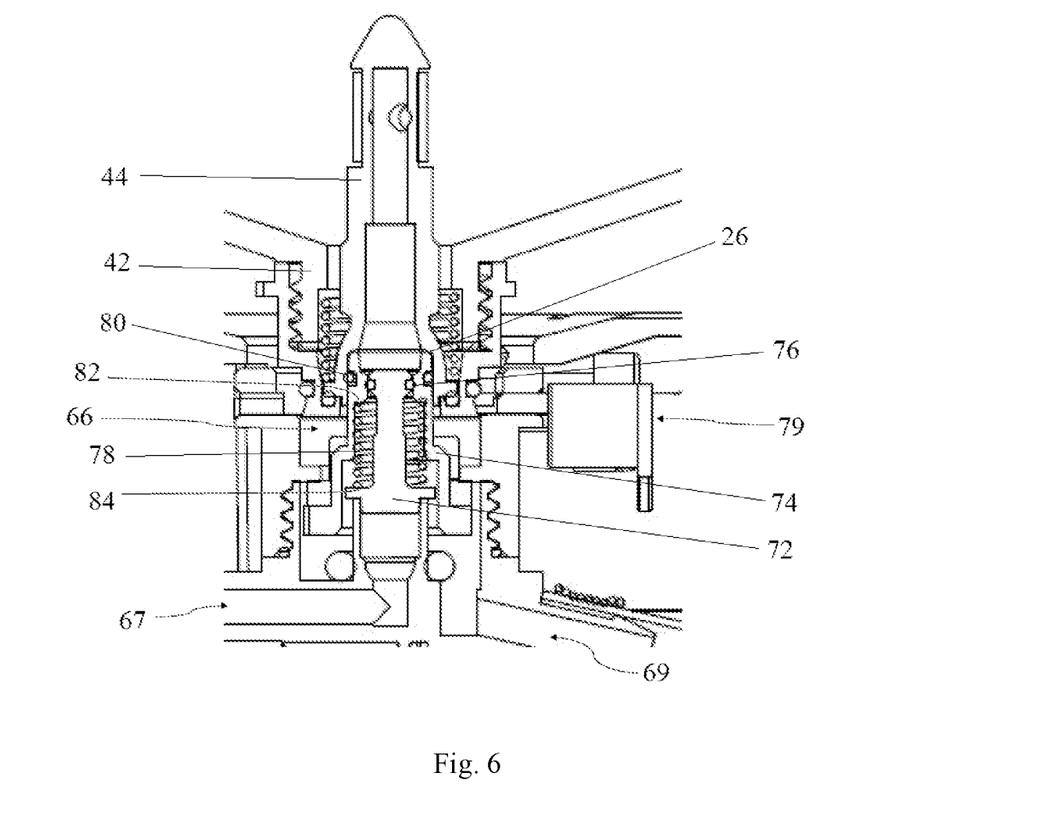
FIG. 6 is a partial enlarged view of the sealant container and the inflator of the tire repair and inflation device in FIG. 4.

The connecting portion 66 is connected with the sealant container 62, and is configured as a second valve mechanism, comprising a second valve core 72, a second valve seat 74, a connecting portion sealing element 76 and a second spring element 78. The second valve core 72 is arranged in the second valve seat 74 and fixed in the inflator 64. For a clear illustration, FIG. 6 is a partial enlarged view of FIG. 4. The second valve seat 74 is movable relative to the second valve core 72. Through the second spring element 78, the second valve seat 74 can move back and forth relative to the second valve core 72. Similar to the arrangement of the first spring element, one end of the second spring element 78 (such as a spring) is connected with an inward-projecting flange 82 of the second valve seat 74, and the other end is connected with a flange 84 of the second valve core 72. The second valve seat 74 has an initial position, as shown in FIG. 4 or 6. Once the second valve seat 74 leaves the initial position as an external force is applied, the second valve seat 74 moves relative to the second valve core 72, and the second spring element 78 is squeezed (the state shown in FIG. 5). The squeezing force will move the second valve seat 74 back to the initial position after the external force is removed. The connecting portion sealing element 76 is fixed on the head of the second valve core 72. In the illustrated embodiment, the connecting portion sealing element 76 is sleeved on the second valve core 72. When the second valve seat 74 is in the initial position, the connecting portion sealing element 76 is located between the second valve core 72 and the second valve seat 74 (as shown in FIG. 4 or 6), sealing the second valve core 72 and the second valve seat 74, thus preventing the gas from flowing out of the connecting portion 66 and avoiding the gas leakage problem of the inflator. When the second valve seat 74 moves relative to the second valve core 72, a gap is present between the second valve seat 74 and the second valve core 72, so the connecting portion sealing element 76 no longer acts (as shown in FIG. 5). In addition, the connecting portion sealing element 76 can also be arranged on the second valve seat 74.

In the embodiment shown in FIG. 6, the head of the second valve seat 74 is configured to be engaged with the interface 26 of the sealant container (i.e., the step). When the sealant container 62 and the inflator 64 are installed in place, the second valve seat 74 is inserted into the interior of the first valve core 44. Because the head of the second valve seat 72 is engaged with the interface 26, the interaction between the two can cause the first valve core 44 to move relative to the first valve seat 42, and at the same time the second valve seat 74 to move relative to the second valve core 72, so that the gas from the third channel 67 can enter into the first valve core 44 through the connecting portion 66. The outer circumference of the second valve seat 74 is further provided with a sealing ring 80. When the second valve seat 74 enters into the interior of the first valve core 44, the sealing ring 80 acts to prevent gas leakage.

A locking device 79 is additionally provided in the inflator 64 to lock the sealant container 62 and the inflator 64 after they are installed in place. The sealant container 62 has high pressure during use. The locking device 79 can ensure that the sealant container 62 will not move relative to the inflator 64 or separate from the inflator 64, thereby increasing the safety performance. In the illustrated embodiment, the locking device 79 is arranged on one side of the engagement area between the connecting portion 66 and the sealant container 62 in the inflator 64. FIG. 4 shows an unlocked state, and FIG. 5 shows a locked state. The locking device 79 can lock the sealant container and the inflator in various ways. In the illustrated embodiment, the sealant container 62 is installed onto the inflator 64 by rotating relative to the inflator 64. After rotation by a designed angle, the locking device 79 automatically ejects after being triggered to snap the sealant container 62 and the inflator 64 together.

Figure 8:
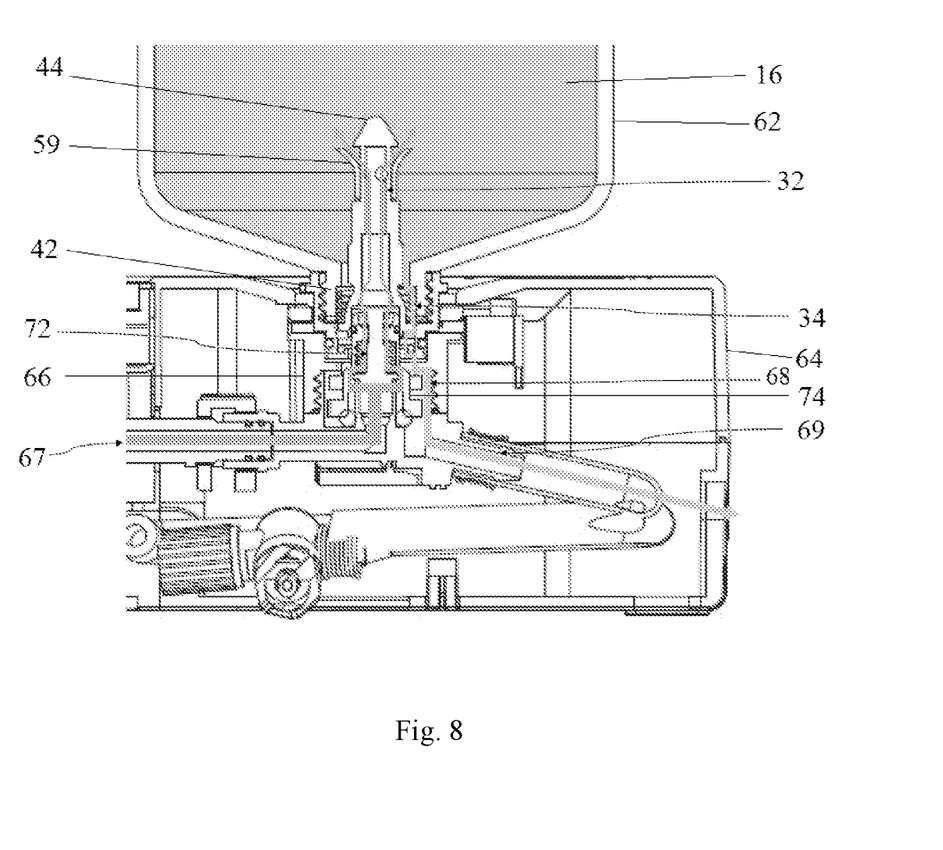
FIG. 8 is a path diagram of the flow of the gas and sealant of the tire repair and inflation device according to the present application during the tire repair operation.

Returning to FIGS. 2-3, the gas entering the first valve core 44 can enter into the internal space of the container body through the outlet 28 at the inner end 24. The inner end 24 is further provided with a first sealing element 59, which is deformable, to cover the outlet 28. The first sealing element 59, a silicone sleeve as shown in the figures, is sleeved outside the circumferential outer surface of the inner end 24, and has a contraction state (as shown in FIGS. 2-3) and an expansion state (as shown in FIG. 8). When the first sealing element 59 is in a contraction state, it closes the outlet 28, so the sealant will not enter into the outlet 28. When there is high pressure gas in the first valve core 44, the high-pressure gas pushes the first sealing element 59 through the outlet 28, turning the first sealing element 59 into an expansion state, so that a gap is present between the expanded first sealing element 59 and the outlet 28, and the gas from inside the first valve core 44 enters into the internal space through the outlet 28.

The pressure from the inflator is far greater than the atmospheric pressure in the sealant container. When under pressure, the first sealing element 59 automatically expands and opens, allowing gas to enter the sealant container. Because the sealant container is inverted for use, high pressure coupled with light density of the gas allows the gas to automatically blow down the sealant when the gas enters the sealant container, so that the gas exists at the top of the sealant container while the sealant is gathered at the bottom of the sealant container in the inverted state.

Figure 7:
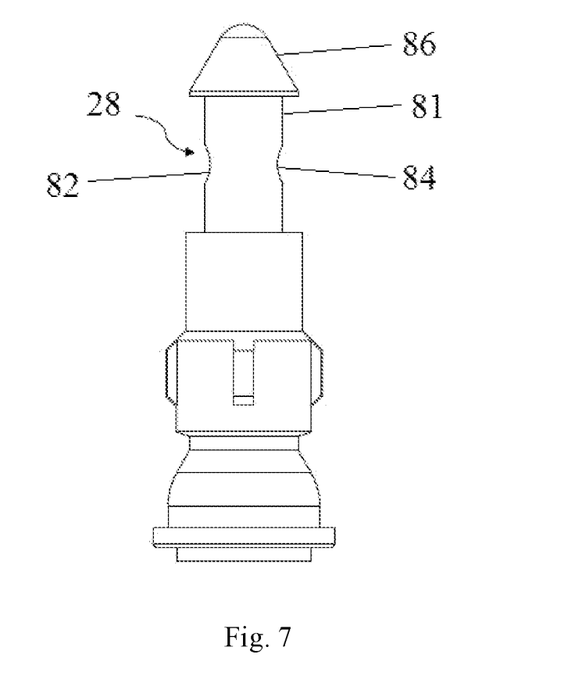
FIG. 7 is a structural schematic diagram of an embodiment of the first valve core of the sealant container according to the present application.

FIG. 7 shows the structural schematic diagram of an embodiment of the first valve core. A groove 81 is provided at the inner end for receiving and positioning the first sealing element (not shown). When the first sealing element is arranged on the groove 81, the first sealing element is in interference fit with the groove 81, thereby sealing the outlet 28. Moreover, in general, when the sealant container is not in use, the gas and liquid in the sealed sealant container will expand due to the high temperature storage condition, and accordingly the first sealing element will expand outward. However, since the first sealing element on the first valve core according to the present application is positioned on the groove 81 of the first valve core, the expansion of gas and liquid in the sealant container will make the first sealing element more closely fit the groove 81 of the first valve core, which leads to a better sealing effect. The internal pressure in the container under high temperature conditions helps the first sealing element seal the outlet better.

The outlet 28 comprises a first opening 82 and a second opening 84, which are symmetrically arranged on the groove 81 to help stabilize the gas flow. It is conceivable that the number of outlets 28 is not limited to two, but more. A plurality of outlets can be arranged on the groove circumferentially or in the form of array.

A conical head 86 is additionally provided at the top of the groove 81 to facilitate the first sealing element to be sleeved from the conical head 86 and concentrically arranged on the groove 81.

FIG. 8 schematically depicts the use status of the sealant container. When the sealant container 62 and the inflator 64 are installed in place, the first valve core 44 moves upward relative to the first valve seat 42, and the second valve seat 74 moves downward relative to the second valve core 72. The first valve mechanism and the second valve mechanism are both opened. A gas inlet path is established between the third channel 67, the connecting portion 66 and the first channel 32. At the same time, a sealant outlet path is established between the second channel 34, the connecting portion 66 and the fourth channel 69. The arrows in the figure show that the gas enters into the first channel 32 from the third channel 67 through the connecting portion 66, pushes the first sealing element 59, enters into the internal space 16, applies pressure to the sealant to force it to flow downward along the second channel 34 to enter into the connecting portion 66 and finally gathers at the fourth channel 69 for flowing to the tire to be repaired. The connecting portion 66 is provided with a guide channel 68. When the sealant container is installed in place, the guide channel 68 is located between the second channel 34 and the fourth channel 69 to guide the sealant flowing out of the sealant container to the fourth channel 69. For a clear illustration, it is only shown that the sealant flows out of the right side of the sealant container and enters into the guide channel 68 on the right side. It should be conceivable, however, that in one embodiment of the present application, the sealant can flow out of the sealant container along an annular path, continue to flow into the connecting portion along a further annular path, and gather at the fourth channel 69 after passing through the guide channel 68.

FIG. 8 already shows the flow of gas and sealant inside the tire repair and inflation device during tire repair operation. It is also conceivable that when the tire inflation operation is in progress, the gas in the third channel 67 directly flows into the fourth channel 69. At this time, the fourth channel 69 is not open to the guide channel 68.

Although the specific embodiments of the present application have been illustrated and described in detail to explain the principle of the present application, it should be understood, however, that the present application can be implemented in other ways without departing from the principle.

The invention claimed is:

1. A sealant container, comprising:
   a container body having an internal space for storing sealant and a container mouth comprising a first part and a second part, the container mouth having an inner wall; and
   a core component configured to be inserted into the container mouth and extend toward the internal space after insertion, the core component having an outer end, an inner end, and a first channel between the outer end and the inner end inside the core component for passage of gas, wherein the outer end is provided with an interface, and the inner end is provided with at least one openable outlet to communicate with the internal space when the outlet is opened;
   wherein the inner wall further defines a second channel for passage of sealant;
   a first valve seat, wherein at least a portion of the inner wall forms the first valve seat;
   a first valve core, wherein the first valve core is the core component, and the first valve core is repeatedly movable relative to the first valve seat and has an initial position, and
   a container mouth sealing element arranged between the first valve seat and the first valve core for closing the second channel;
   wherein the container mouth sealing element is fixed on the first valve seat, and the second channel is provided with a first spring element, wherein the first spring element is configured so that when the first valve core is in the initial position, the first spring element presses a part of the first valve core against the container mouth sealing element, so that the container mouth sealing element closes the second channel.

2. The sealant container according to claim 1, wherein the second channel is an annular channel defined by a gap between the inner wall and the core component.

3. The sealant container according to claim 1, wherein the first part and the second part are fit and connected, wherein the first part is integrally formed with the container body, and the second part is made of nylon material to increase strength.

4. The sealant container according to claim 1, wherein the core component is provided with a deformable first sealing element at the inner end, wherein the first sealing element covers the outlet to close the outlet when not deformed, and expands to open the outlet when deformed.

5. The sealant container according to claim 4, wherein the first sealing element is made of silicone and sleeved on the inner end.

6. The sealant container according to claim 5, wherein the inner end is provided with a groove to receive the first sealing element.

7. The sealant container according to claim 5, wherein the inner end is further provided with a conical head to facilitate the installation of the first sealing element onto the core component.

8. The sealant container according to claim 6, wherein a plurality of the outlets are arranged symmetrically on the groove.

9. A tire repair and inflation device, comprising:
   an inflator having a connecting portion; and
   a sealant container comprising:
   a container body having an internal space for storing sealant and a container mouth comprising a first part and a second part, the first part and the second part having an inner wall; and
   a core component configured to be inserted into the container mouth and extend toward the internal space after insertion, the core component having an outer end, an inner end, and a first channel between the outer end and the inner end inside the core component for passage of gas, wherein the outer end is provided with an interface, and the inner end is provided with at least one openable outlet to communicate with the internal space when the outlet is opened;
   wherein the inner wall of the first part and the second part further defines a second channel for passage of sealant, and
   wherein the sealant container is installed onto the connecting portion through the interface.

10. The tire repair and inflation device according to claim 9, wherein the inflator comprises a third channel to communicate with the first channel; and a fourth channel to selectively communicate with the second channel and the third channel, wherein the fourth channel is configured to receive gas from the third channel or sealant from the second channel, so as to deliver gas or sealant to a tire.

11. The tire repair and inflation device according to claim 9, wherein the inflator further comprises a locking device, wherein when the sealant container and the inflator are installed in place, the locking device fastens the sealant container and the inflator.

12. The tire repair and inflation device according to claim 11, wherein the locking device is arranged in the inflator, and snaps the sealant container and the connecting portion together at the side of the container mouth.

13. The tire repair and inflation device according to claim 10, wherein the connecting portion has a second valve mechanism, comprising:
- a second valve core configured to be inserted into the core component to engage with the interface;
- a second valve seat for receiving the second valve core, wherein the second valve seat is configured to move relative to the second valve core, and
- a connecting portion sealing element arranged on the second valve core or the second valve seat to prevent gas from the third channel from passing through.

14. The tire repair and inflation device according to claim 13, wherein the second valve core is fixed in the inflator, and the second valve mechanism further comprises a second spring element respectively connected with the second valve core and the second valve seat, so that the second valve seat moves back and forth relative to the second valve core.

15. The tire repair and inflation device according to claim 9, wherein the second channel is an annular channel defined by a gap between the inner wall and the core component.

16. The tire repair and inflation device according to claim 9, further comprising:
- a first valve seat, wherein at least a portion of the inner wall forms the first valve seat;
- a first valve core, wherein the first valve core is the core component, and the first valve core is repeatedly movable relative to the first valve seat and has an initial position, and
- a container mouth sealing element arranged between the first valve seat and the first valve core for closing the second channel.

17. The tire repair and inflation device according to claim 16, wherein the container mouth sealing element is fixed on the first valve seat, and the second channel is provided with a first spring element, wherein the first spring element is configured so that when the first valve core is in the initial position, the first spring element presses a part of the first valve core against the container mouth sealing element, so that the container mouth sealing element closes the second channel.

18. The tire repair and inflation device according to claim 16, wherein the first part and the second part are fit and connected, wherein the first part is integrally formed with the container body, and the second part is made of nylon material to increase strength.

19. The tire repair and inflation device according to claim 9, wherein the core component is provided with a deformable first sealing element at the inner end, wherein the first sealing element covers the outlet to close the outlet when not deformed, and expands to open the outlet when deformed.

20. The tire repair and inflation device according to claim 19, wherein the inner end is provided with a groove to receive the first sealing element.

* * * * *